US011080231B2

(12) United States Patent
Groves (10) Patent No.: US 11,080,231 B2
(45) Date of Patent: Aug. 3, 2021

(54) FILE CREATION WITH REQUESTER-SPECIFIED BACKING

(71) Applicant: Micron Technology, Inc., Boise, ID (US)

(72) Inventor: John M. Groves, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 178 days.

(21) Appl. No.: 16/236,928

(22) Filed: Dec. 31, 2018

(65) Prior Publication Data
US 2020/0210371 A1 Jul. 2, 2020

(51) Int. Cl.
*G06F 17/00* (2019.01)
*G06F 16/11* (2019.01)
*G06F 16/188* (2019.01)

(52) U.S. Cl.
CPC ............ *G06F 16/11* (2019.01); *G06F 16/188* (2019.01)

(58) Field of Classification Search
None
See application file for complete search history.

(56) References Cited

U.S. PATENT DOCUMENTS

| 6,049,853 A * | 4/2000 | Kingsbury ............... G06F 12/08 709/213 |
| 7,783,666 B1 * | 8/2010 | Zhuge ................... G06F 16/122 707/783 |
| 8,095,770 B2 * | 1/2012 | Cameron .............. G06F 12/109 711/202 |
| 9,584,326 B2 * | 2/2017 | Dhuse ................. G06F 12/1408 |
| 9,959,207 B2 | 5/2018 | Lu et al. |
| 10,599,611 B1 * | 3/2020 | Dong ...................... G06F 16/13 |
| 2003/0079158 A1 * | 4/2003 | Tower ................. G06F 11/1438 714/23 |
| 2003/0231855 A1 * | 12/2003 | Gates ....................... H04N 5/76 386/351 |
| 2007/0162510 A1 * | 7/2007 | Lenzmeier .......... G06F 16/2365 |
| 2009/0112880 A1 * | 4/2009 | Oliveira .................. G06F 16/13 |
| 2009/0112921 A1 * | 4/2009 | Oliveira ................ G06F 16/178 |

(Continued)

OTHER PUBLICATIONS

"International Application Serial No. PCT US2019 066019, International Search Report dated Apr. 10, 2020", 3 pgs.

(Continued)

*Primary Examiner* — Hasanul Mobin
(74) *Attorney, Agent, or Firm* — Schwegman Lundberg & Woessner, P.A.

(57) ABSTRACT

Various embodiments described herein provide for creation of a file that is backed by a requester-specified set of data storage objects. According to some embodiments, a request is received to create a new file on a file system that is backed by a specified set of data storage objects stored on a set of memory components. For example, the specified set of data storage objects can be associated with storage of one or more portions of an existing file stored on the set of memory components. In response to receiving the request to create the new file, a file data structure can be generated on the file system that represents the new file, where the file data structure comprises a mapping to the specified set of data storage objects. Subsequently, the request can be responded to with data that confirms creation of the new file on the file system.

20 Claims, 7 Drawing Sheets

(56) References Cited

U.S. PATENT DOCUMENTS

| | | | |
|---|---|---|---|
| 2009/0228429 A1* | 9/2009 | Diaconu | G06F 16/188 |
| 2011/0072059 A1 | 3/2011 | Guarraci | |
| 2013/0332700 A1* | 12/2013 | Kopylovitz | G06F 3/0631 |
| | | | 711/209 |
| 2015/0020071 A1* | 1/2015 | Phelan | G06F 9/45558 |
| | | | 718/1 |
| 2015/0134930 A1* | 5/2015 | Huang | G06F 12/1009 |
| | | | 711/206 |
| 2016/0077761 A1 | 3/2016 | Stabrawa et al. | |
| 2017/0139932 A1* | 5/2017 | Hasegawa | G06F 16/122 |
| 2018/0004649 A1* | 1/2018 | Puthiyedath | G06F 12/0238 |
| 2018/0107674 A1 | 4/2018 | Cantwell et al. | |
| 2018/0137013 A1* | 5/2018 | Poojary | G06F 3/0619 |
| 2019/0250819 A1* | 8/2019 | Jain | G06F 3/061 |
| 2019/0324880 A1* | 10/2019 | Rose | G06F 11/3037 |

OTHER PUBLICATIONS

"International Application Serial No. PCT US2019 066019, Written Opinion dated Apr. 10, 2020", 6 pgs.

\* cited by examiner

FILE CREATION WITH REQUESTER-SPECIFIED BACKING

TECHNICAL FIELD

Embodiments of the disclosure relate generally to memory sub-systems and more specifically, to a creation a file on a file system that enables creation of a file backed by a requester-specified set of data storage objects.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to creation of a file on a file system, where the file is backed by a set of existing data storage objects specified by a requester (e.g., user-space software application acting as a function caller that calls a function to request creation of the file). For various embodiments, the set of existing data storage objects specified by the requester comprises one or more data storage objects that exist prior to the creation of the file backed by the requester-specified (e.g., caller-specified) set of existing data storage objects and prior to the request for creation of the file (i.e., the set of existing data storage objects is not generated for the creation of the file). A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data (e.g., via write requests) to be stored at the memory sub-system and can request data to be retrieved (e.g., via read requests) from the memory sub-system.

A memory sub-system can include multiple memory components that can store data from the host system. The memory sub-system can further include a memory sub-system controller that can communicate with each of the memory components to perform operations such as reading data, writing data, or erasing data at the memory components in response to requests received from the host system. Any one or more of the memory components of the memory sub-system may include a media controller to manage memory cells of the memory component, communicate with the memory sub-system controller, and execute memory requests (e.g., read or write) received from the memory sub-system controller.

As used herein, a data storage object can comprise an abstracted data object for a software or hardware data storage sub-system, which may be created or accessed via an application program interface (API). For various embodiments, a data storage object is different from a file object and different from a block device storage object. For instance, a media data block (media block) can be one type of data storage object that serves as a software/firmware-implemented abstraction of a set of block device storage objects (e.g., data blocks of a block storage device). As used herein, a media block can comprise (or otherwise associated with) a universally unique identifier, which can permit the media block to be addressed by the universally unique identifier. A metadata log can be another type of data storage object that can store metadata storage regarding one or more media blocks and can log/record transactions with respect to one or more media blocks. Another example data storage object can comprise a single key-value pair or a key-value pair data structure that accepts key-value pairs for storage.

In some applications, a pool of data storage media (media pool) can be implemented by one or more memory devices (e.g., memory components) and presented as a single logical data storage volume comprising one or more media blocks. A file system can be implemented based on this single logical data storage volume comprising one or more media blocks. Some embodiments described herein interact with a file system that stores one or more files using a set of media data blocks and a set of metadata log, which stores metadata for the set of media data blocks and logs/records transactions with respect to the media blocks based on transactions executed with respect to the file system. For some such embodiments, the specified set of existing data storage objects backing a created file comprises one or more of the media data blocks or one or more of the metadata logs.

In some applications, such as database storage and volume data storage (e.g., cloud storage), key-value data structures are used to store data on a single logical data storage volume comprising one or more media blocks. Such key-value data structures can accept a key-value pair for storage and are configured to respond to queries for a value based on a key. Key-value data structures can comprise such structures as tree data structures, examples of which can include log-structured merge tree (LSM tree) and a radix data tree. For instance, a key-value data tree structure (e.g., used to store files in associate with a file system) can be implemented using a set of data storage objects (e.g., media blocks) to store one or more key-value pairs (e.g., where media blocks serving as value blocks store values of the key-value pairs, and media blocks serving as key blocks store keys of the key-value pairs). As used herein, a tree data structure comprises one or more nodes with connections between parent and child nodes.

Various embodiments described herein provide for creation of a file on a file system, where the file is backed by a set of existing data storage objects specified by a requester. For various embodiments described herein, an example requester can comprise a software application (e.g., user-space software application) acting as a function caller (hereafter, caller) that calls a function to generate or send a request to create the file backed by the set of existing data storage objects. According to various embodiments, the specified set of existing data storage objects backing the file comprises one or more data storage objects that exist prior to the creation (or request to create) the file. For instance, the set of existing data storage objects can be associated with storage of one or more existing files (or one or more portions of an existing file) on a file system, and the created file can facilitate access of those existing data storage objects (e.g., access to media blocks or metadata logs associated with the one or more portions an existing file). The specified set of existing data storage objects can comprise an ordered collection of data storage objects. Additionally, the specified set of existing data storage objects can form (at least part of) a data structure, such as a LSM tree or a radix tree, used in storage of the one or more existing files (or other data objects). An embodiment described herein can be implemented into a file system configured to create the file backed by the specified set of existing data storage objects, and this file system which may be separate from a file system that stores the specified set of data objects.

For some embodiments, the created file is memory mapped to volatile memory, thereby providing memory-mapped access to the created file. In this way, resulting memory-mapped file creates a virtual memory address space based on the created file. For some embodiments, the resulting memory-mapped filed can serve as a memory cache file for accessing (e.g., in order traversal of) one or more data storage objects in the specified set of existing data storage objects (e.g., media blocks or metadata logs associated with one or more existing files). For instance, where the specified set of existing data storage objects is associated with a plurality of key-value pairs, the memory-mapped file described herein can provide demand-paged, in order traversal of key-value pairs stored on a key-value data structure (e.g., one implemented using media blocks or metadata logs). The created file can be memory mapped to the volatile memory using an operating system call, such as a mmap POSIX-compliant system call (e.g., one supported by a Unix or Linux operating system). Additionally, the created file can be memory mapped such that the created file can be demand-paged accessed. Accordingly, for some embodiments, after creation of a file backed by a specified set of existing data storage objects (e.g., media blocks) associated with one or more files stored on a file system, the created file is memory mapped to volatile memory to facilitate demand-paged access to the set of existing data storage objects of the one or more files. In doing so, the newly created file can enable data storage objects (e.g., media blocks) of the one or more existing files to be demand-paged (e.g., cached) into a sparse memory address space (i.e., that of the volatile memory), while obviating the need for reading the all the data objects of the one or more files into the spare memory address space.

Disclosed herein are some examples of systems that include or use a memory circuit package with an adjustable count of active memory channels, as described herein.

Figure 1:
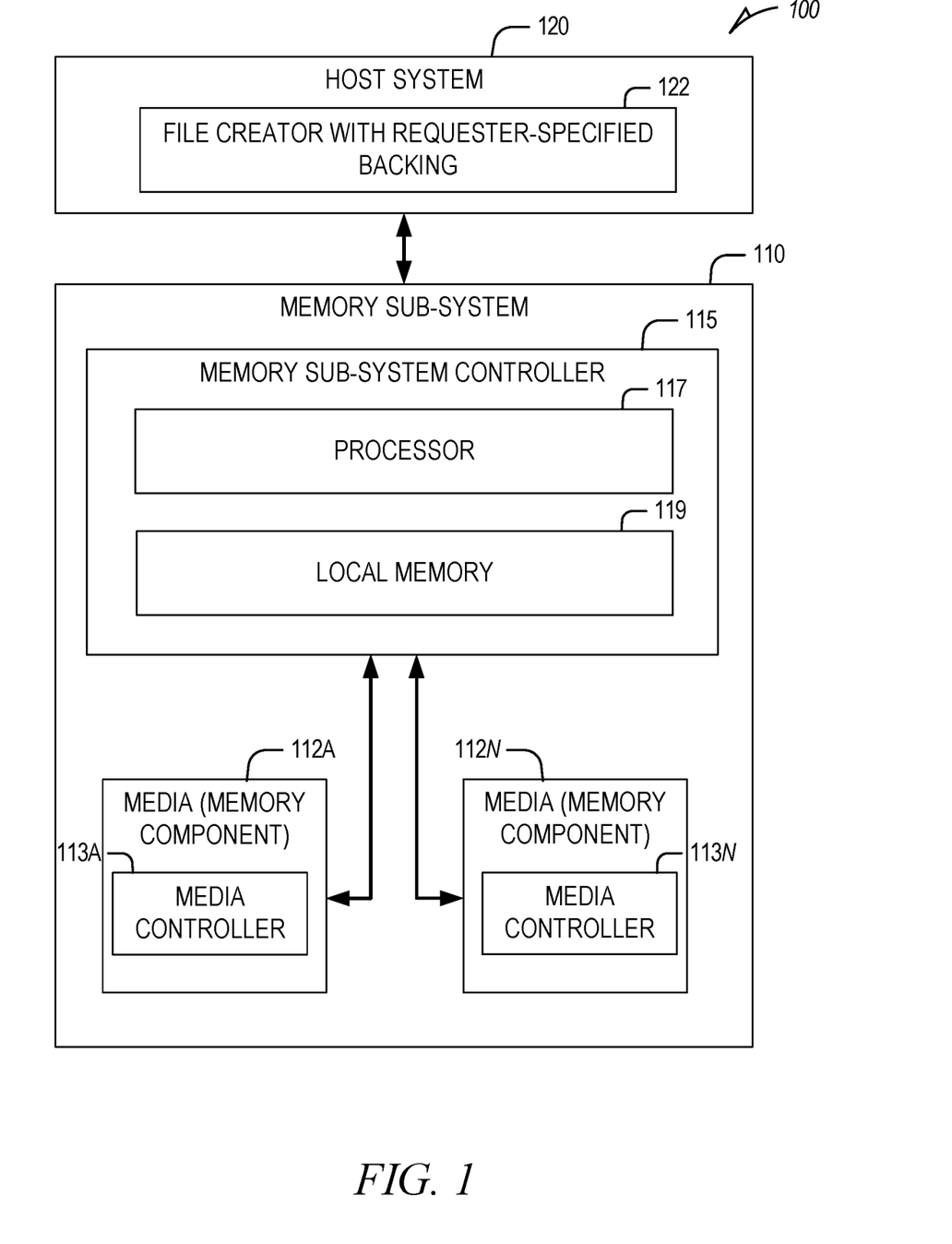
FIG. 1 is a block diagram illustrating an example computing environment including a memory sub-system, in accordance with some embodiments of the present disclosure.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or other such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The host system 120 includes a file creator with requester-specified backing 122 (hereafter, file creator 122) that enables or otherwise facilitates creation of a file (new file) on a file system, where file is backed by a set of existing data storage objects (e.g., media blocks or metadata logs) specified by a requester requesting creation of the file. For some embodiments, the requester comprises a user-space software application operating on the host system 120, which can use an application program interface (API) function to generate the request for the new file based on the specified set of existing data storage objects. For some embodiments, the specified set of existing data storage objects is stored on one or more of the memory components 112A to 112N. For some embodiments, once the file backed by the requester-specified set of existing data storage objects is created, a response is sent to (e.g., the requester/caller) in response to the request to create the file. Depending on the embodiment, the response can comprise data that confirms whether the file requested was successfully created on the file system.

According to some embodiments, once created the file backed by the requester-specified set of existing data storage objects is mapped (e.g., using a mmap operation system call) to a volatile memory of the host system 120. As noted herein, the resulting memory-mapped file backed by the requester-specified set of existing data storage objects can be accessed via the volatile memory of the host system 120, which can provide demand-paged access to the set of existing data storage objects. For some embodiments, the request to create the file comprises a request to create a memory-mapped filed backed by the requester-specified set of existing data storage objects. For such embodiments, once the file is created and memory mapped to the volatile memory, a response can be sent to (e.g., the requester/caller) in response to the request to create a memory-mapped filed backed by the requester-specified set of existing data storage objects.

Depending on the embodiment, operations described herein with respect to the file creator 122 may be performed on the host system 120, on the memory sub-system 110, or some combination of both. For instance, depending on the embodiment, the file creator 122 may comprise logic (e.g., a set of machine instructions, such as firmware) or one or more components that causes the memory sub-system 110 (e.g., the memory sub-system controller 115) to perform operations described herein with respect to the file creator 122. The file creator 122 may comprise a tangible unit capable of performing operations described herein. Further details with regards to the operations of the file creator 122 are described below.

Figure 2:
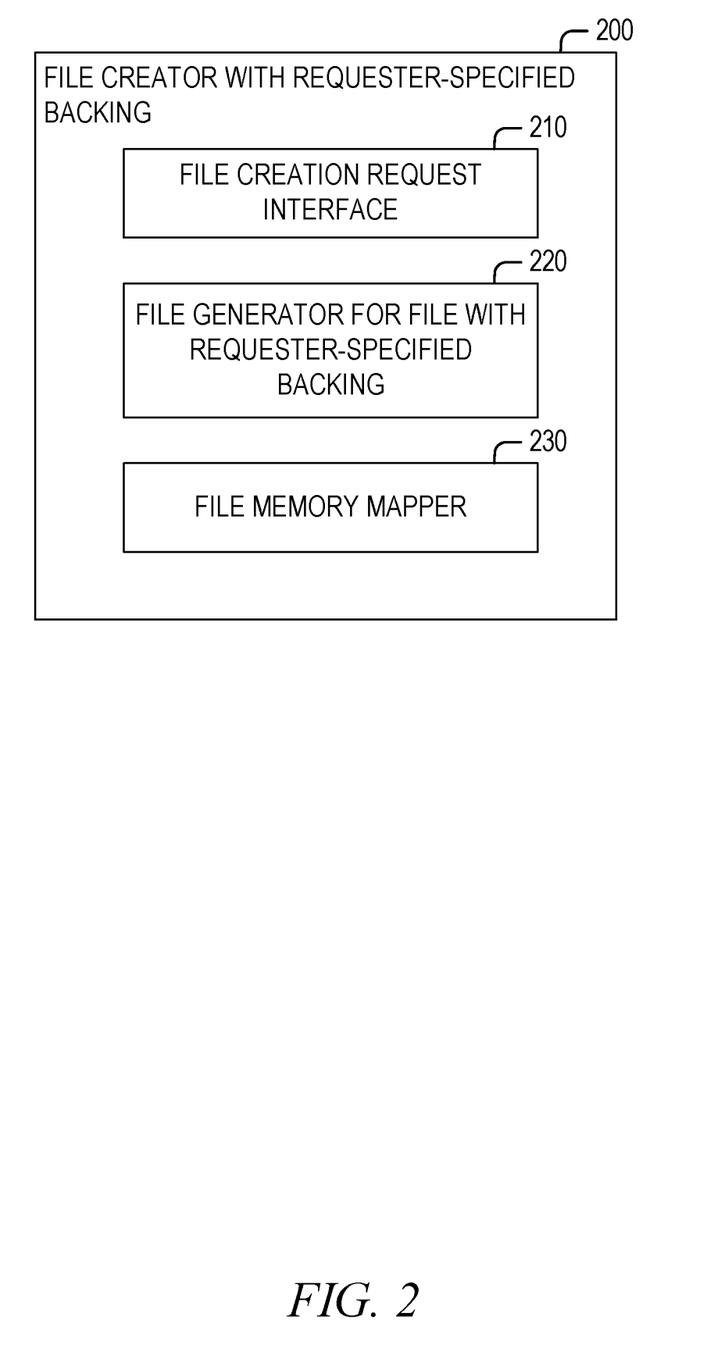
FIG. 2 is a block diagram of an example file creator with requester-specified backing, in accordance with some implementations of the present disclosure.

FIG. 2 is a block diagram of an example file creator with requester-specified backing 200 (hereafter, the file creator 200), in accordance with some implementations of the present disclosure. As illustrated, the file creator 200 comprises a file creation request interface 210, a file generator for file with requester-specified backing 220 (hereafter, the file generator 220), and a file memory mapper 230. For some embodiments, the file creator 200 may differ in components or arrangement (e.g., fewer or more components) than what is illustrated in FIG. 2.

The file creation request interface 210 receives a request (e.g., request from a software application on the host system 120) to create, on a file system, a file (new file) backed by a specified set of existing data storage objects. For some embodiments, file creation request interface 210 receives requests to a request to create, on a file system, a file (new file) backed by a specified set of existing data storage objects and memory mapped to volatile memory. As noted herein, the request can be received from a requester (e.g., user-space software application acting as a function caller) via an application program interface (API).

The file generator 220 generates on the file system a file data structure that represents the file backed by a set of existing data storage objects specified by the request received by the file creation request interface 210. According to various embodiments, the file data structure comprises (or facilitates) a mapping to the specified set of existing data storage objects. For some embodiments, the mapping comprises one or more addresses or identifiers (e.g., universally unique identifiers) associated with each of the data storage objects in the specified set of existing data storage objects. Additionally, for some embodiments, the file data structure comprises a file data structure associated with a virtual file system, such as an inode data structure associated with a virtual file system for a POSIX-compliant operating system (e.g., Unix or Linux). As used herein, a virtual file system can comprise a software/firmware-implemented abstraction layer on top of another file system (e.g., file system of a different type).

According to some embodiments, the file data structure generated by the file generator 220 is one that enables a memory mapping function (e.g., operating system call, such as mmap) to memory map the new file to volatile memory (e.g., primary memory of the host system 120, such as RAM), thereby enable memory mapped I/O of the new file. As noted herein, memory mapping the new file can enable the new file to be mapped to a specified set of existing data storage objects (e.g., media blocks or metadata logs) associated with one or more existing files stored on a particular file system (e.g., key-value store file system using a radix data tree and based media blocks or metadata logs of a media pool), which may be a different file system from the one on which the file data structure is generated at operation 410. The specified set of existing data storage objects can comprise an ordered collection of data storage objects, where the ordered collection can be one associated with a key-value data tree structure (e.g., based on LSMT) that stores key-value pairs and that is used for file system storage of one or more existing files.

The file memory mapper 230 causes the created file (created via the file data structure generated on the file system by the file generator 220) to be memory mapped to volatile memory (e.g., of the host system 120). For some embodiments, the created file is memory mapped to the volatile memory by a memory mapping function, such as a mmap operating system call. For some embodiments, the memory-mapped file can be removed to free up one or more computing resources (e.g., volatile memory space, file data structure space, etc.) being used by the memory-mapped file. For instance, to remove the memory-mapped file, some embodiment can un-map the memory-mapped file from the volatile memory and the file data structure representing the memory-mapped file on the file system can be removed or deleted. The memory-mapped file described herein can be removed when, for example, the memory mapped file is no longer needed.

Figure 3:
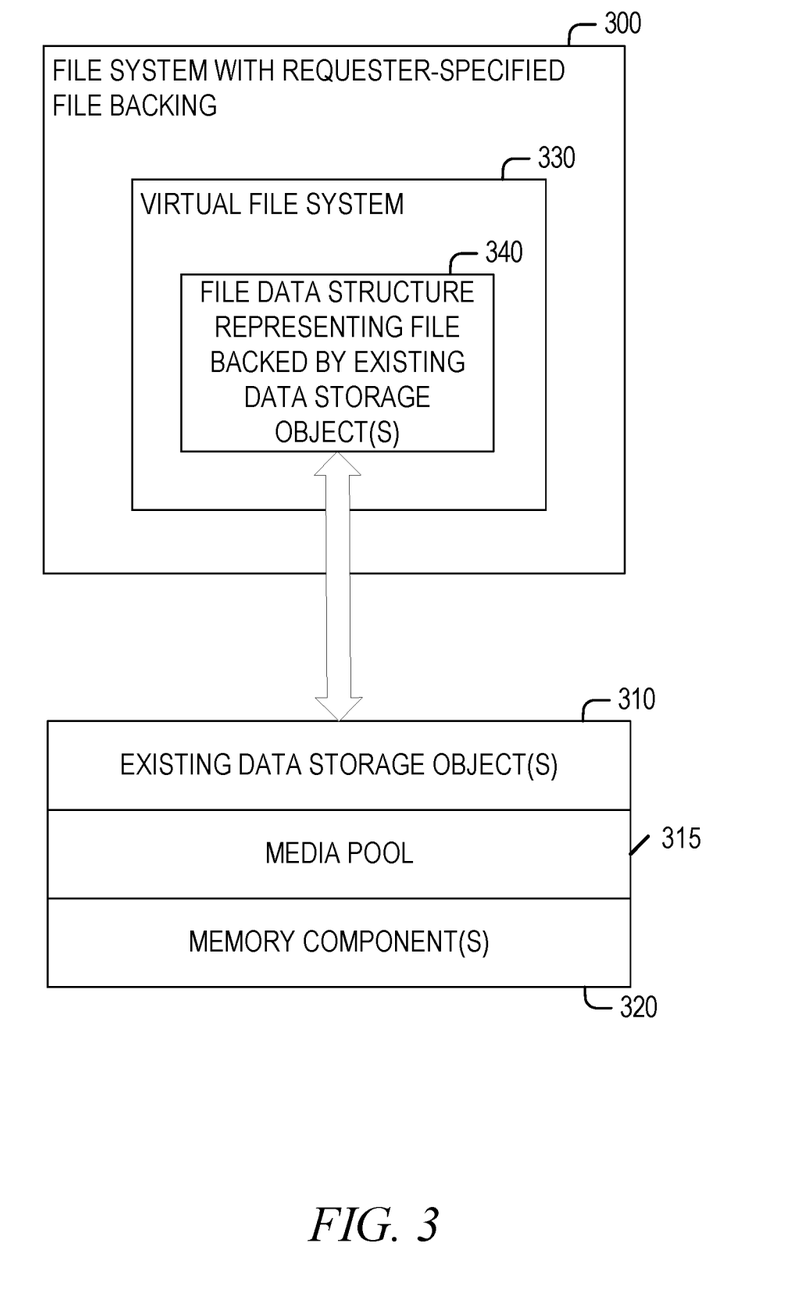
FIG. 3 is a block diagram of an example file system with requester specified file backing, in accordance with some implementations of the present disclosure.

FIG. 3 is a block diagram of an example file system 300 with requester specified file backing, in accordance with some implementations of the present disclosure. According to some embodiments, the file system 300 is capable of creating a file that is backed by a set of existing data storage objects 310 as specified by a requester (e.g., caller). As shown, the file system 300 is implemented using a virtual file system 330 with the ability to create a file backed by requester-specified set of existing data storage objects from the existing data storage object(s) 310. For some embodiments, the creation of the file on the file system 300 causes the generation of a file data structure 340 representing the file backed by the existing data storage object(s) 310. As noted herein, the file data structure 340 can comprise, for example, an inode data structure (e.g., used by a POSIX-compliant operating system). For some embodiments, the file data structure 340 comprises a mapping to the existing data storage object(s) 310. The existing data storage object(s) 310 can comprise, for example, one or more media blocks or metadata logs. For some embodiments, a media pool 315 that presents memory component(s) 320 as a single logical data storage volume comprising one or more data storage objects (e.g., media blocks). As shown, once a software application opens the file through the file data structure 340, accessing a portion of the file can cause access (e.g., read, write, or both) of one or more data storage objects (of the existing data storage object(s) 310) that correspond to the portion.

Figure 4:
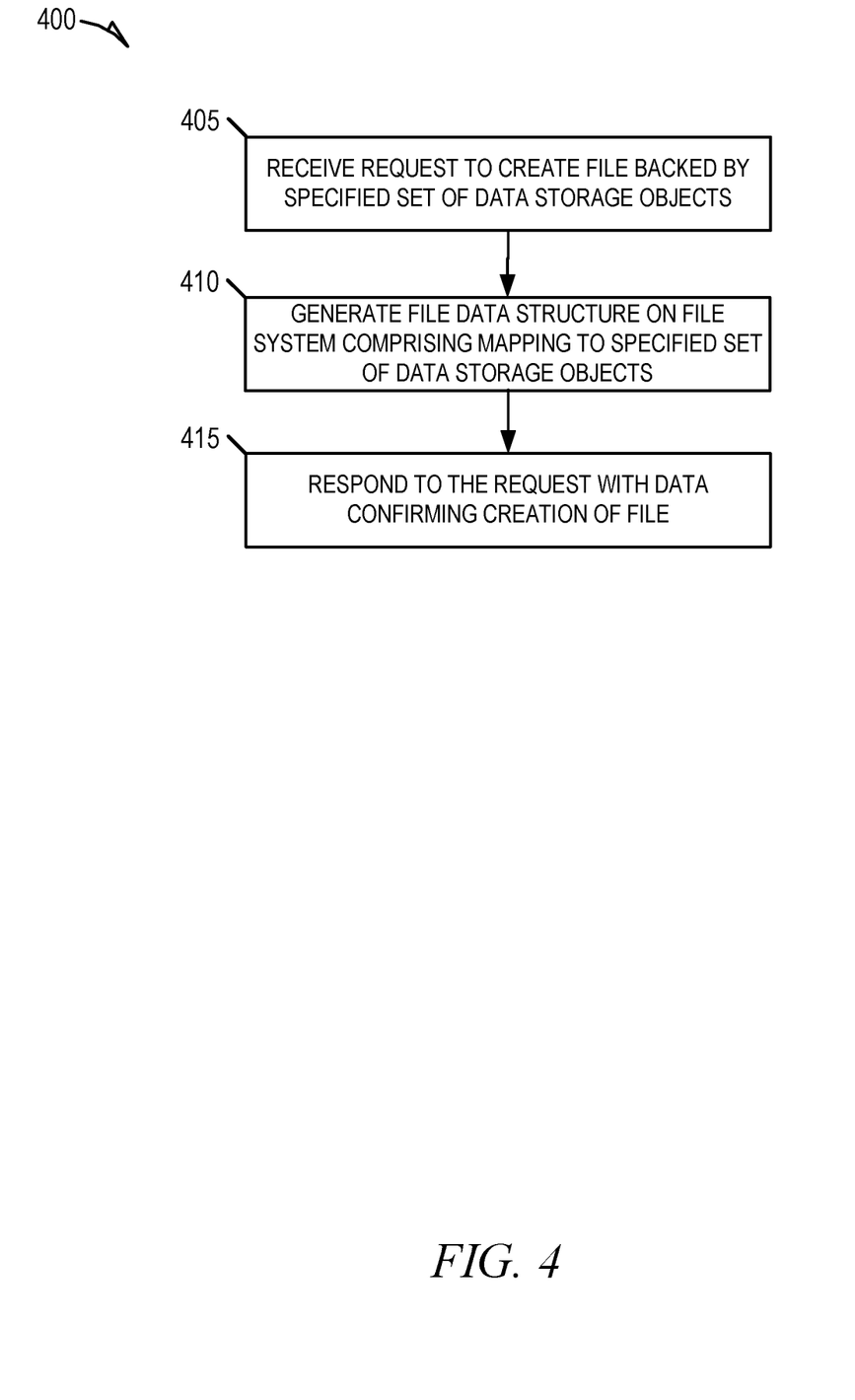
FIGS. 4 and 5 are flow diagrams of example methods creating a file backed by requester-specified set of existing data storage objects, in accordance with some implementations of the present disclosure.
Figure 5:
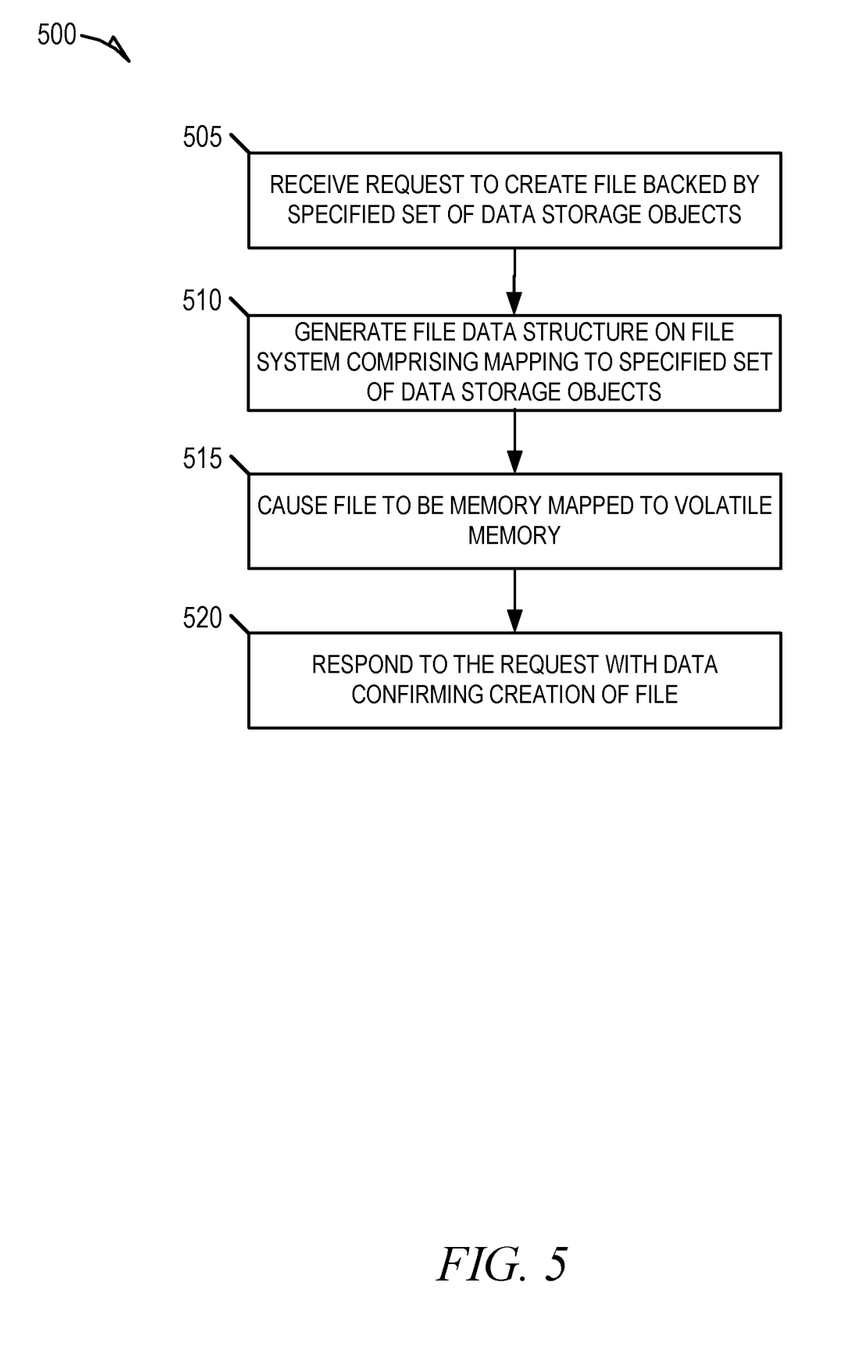

FIGS. 4 and 5 are flow diagrams of example methods creating a file backed by requester-specified set of existing data storage objects, in accordance with some implementations of the present disclosure. Any of methods 400, 500 of FIGS. 4 and 5 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, one or more methods 400, 500 of FIGS. 4 and 5 are performed by the host system 120 of FIG. 1. In these embodiments, the methods 400, 500 may be performed, at least in part, by the file creator 122. Alternatively, one or more methods of FIGS. 4 and 5 are performed by the memory sub-system 110 of FIG. 1 (e.g., the processor 117 of the memory sub-system controller 115). Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Operations of the methods 400, 500 of FIGS. 4 and 5 may be concurrently performed with respect to creation of different files.

Referring now to the method 400 of FIG. 4, at operation 405, a processing device of a host system (e.g., 120) receives (or otherwise retrieves) a request to create a file (new file) on a file system backed by a set of existing data storage objects (e.g., stored on one or more of the memory components 112A and 112N) that is specified by the request. The request can be received from a requester (e.g., software application calling a function to send the request) on the host system, such as user-space software application on the host system via a user-space function (e.g., application program interface (API) function associated with the file system).

At operation 410, the processing device of the host system generates a file data structure on the file system that represents the new file requested for creation (per the request received at operation 405), where the file data structure comprises (or facilitates) a mapping to the specified set of existing data storage objects. Operation 410 can be performed in response to the request received at operation 405. As noted herein, The mapping can comprise one or more addresses or identifiers (e.g., universally unique identifiers) associated with each of the data storage objects in the specified set of existing data storage objects. Additionally, the file data structure can comprise a file data structure associated with a virtual file system, such as an inode data structure associated with a virtual file system for a POSIX-compliant operating system.

Subsequently, at operation 415, the processing device of the host system responds to the request (received at operation 405) with data that confirms creation of the new file on the file system. Depending on the embodiment, the data can comprise a data value indicating the creation is successful (e.g., Boolean value of true, integer value of 1), or a memory address to the file data structure. Once creation is confirmed, a requester can access the file via the file data structure (e.g., via file handler generated based on the file data structure.

Referring now to the method 500 of FIG. 5, for some embodiments, operations 505 and 510 are respectively similar to operations 405 and 410 of the method 400 of FIG. 4. As noted herein, the request received at operation 505 comprises a request to create a memory-mapped filed backed by a requester-specified set of data storage objects (e.g., media blocks).

At operation 515, the processing device of the host system causes the created file (created by the generation of the file data structure on the file system at operation 510) to be memory mapped to volatile memory (e.g., of the host system 120). As noted herein, the memory mapping of the created file to volatile memory can be facilitated, for example, by a mmap operation system call, such as one supported by a POSIX-compliant operating system (e.g., Unix or Linux).

Subsequently, at operation 520, the processing device of the host system responds to the request (received at operation 505) with data that confirms creation of the new file on the file system and memory mapping of the created filed to volatile memory. As noted herein, the data can comprise a data value indicating the creation and memory-mapping is successful (e.g., Boolean value of true, integer value of 1), or a memory address pointing to the virtual address space associated with the newly created and memory-mapped file. Once confirmed, a requester can access the memory-mapped file via the virtual address space.

Figure 6:
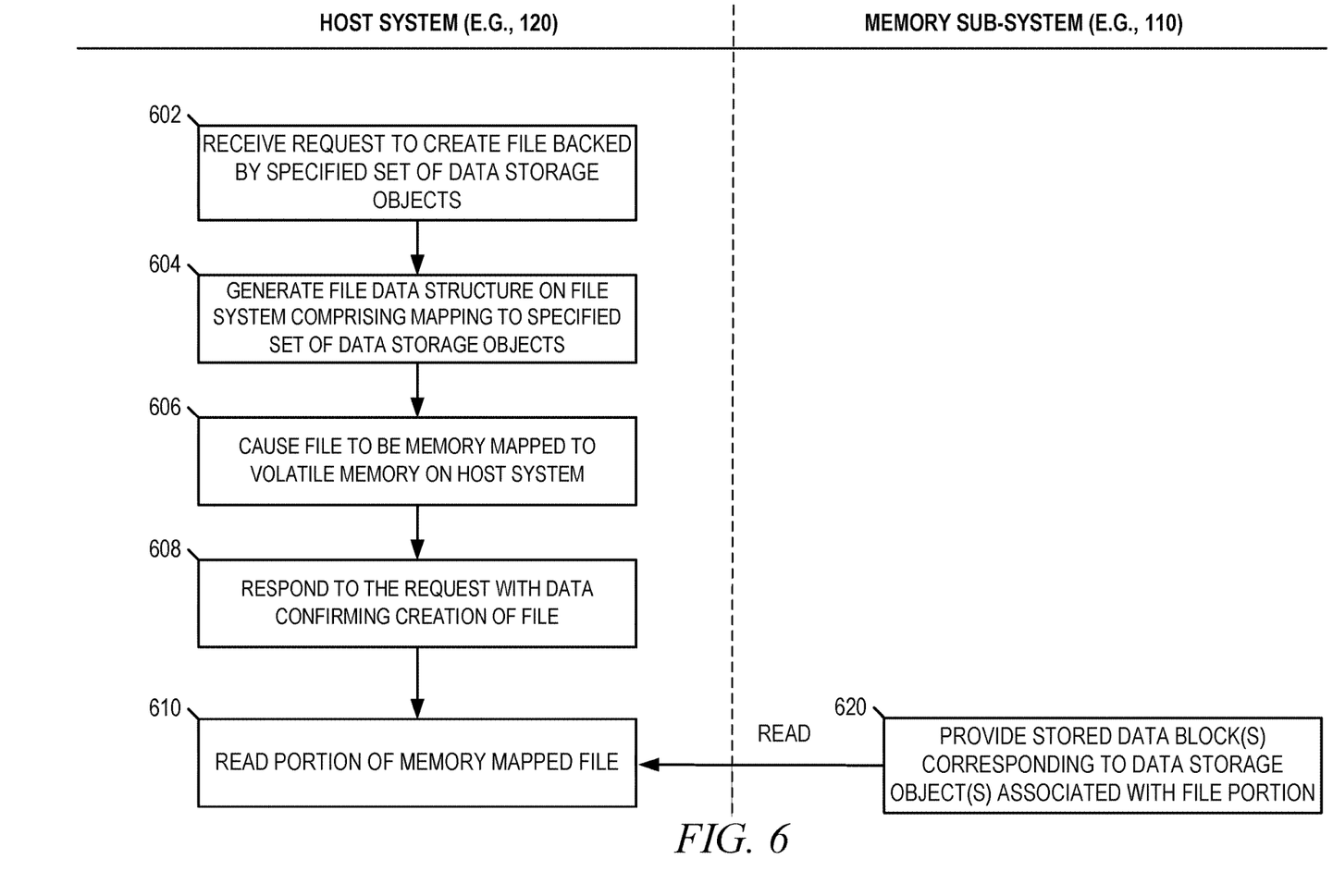
FIG. 6 provides an interaction diagram illustrating interactions between components of a computing environment in the context of an embodiment in which a method is performed for creating a file backed by a requester-specified set of data storage objects.

FIG. 6 provides an interaction diagram illustrating interactions between components of the computing environment 100 in the context of an embodiment in which a method is performed for creating a file backed by a requester-specified set of data storage objects. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the host system 120. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIG. 6, the host system can comprise the host system 120, and the memory sub-system can comprise the memory sub-system 110, where one or more of the memory components 112A to 112N can implement data storage media for providing one or more data storage objects (e.g., media blocks or metadata logs) as described herein.

As shown, at operation 602, the host system 120 receives a request to create a file (new file) on a file system backed by a set of existing data storage objects (e.g., stored on one or more of the memory components 112A and 112N) that is specified by the request. At operation 604, the host system 120 generates a file data structure on the file system that represents the new file requested for creation (per the request received at operation 405), where the file data structure comprises (or facilitates) a mapping to the specified set of existing data storage objects. At operation 606, the host system 120 causes the created file (created by the generation of the file data structure on the file system at operation 604) to be memory mapped to volatile memory (e.g., of the host system 120). At operation 608, the host system 120 responds to the request (received at operation 602) with data that confirms creation of the new file on the file system and memory mapping of the created filed to volatile memory. At operation 610, the host system 120 reads one or more portions of the memory-mapped file. In response, at operation 620, the memory sub-system 110 provides the host system 120 with data block(s) stored on the memory sub-system 110 and corresponding to data storage object(s) associated with the read file portion(s). The data block(s) are read by the host system 120. The data block(s) read from the memory sub-system 110 can be demand-paged into the volatile memory of the host system 120.

Figure 7:
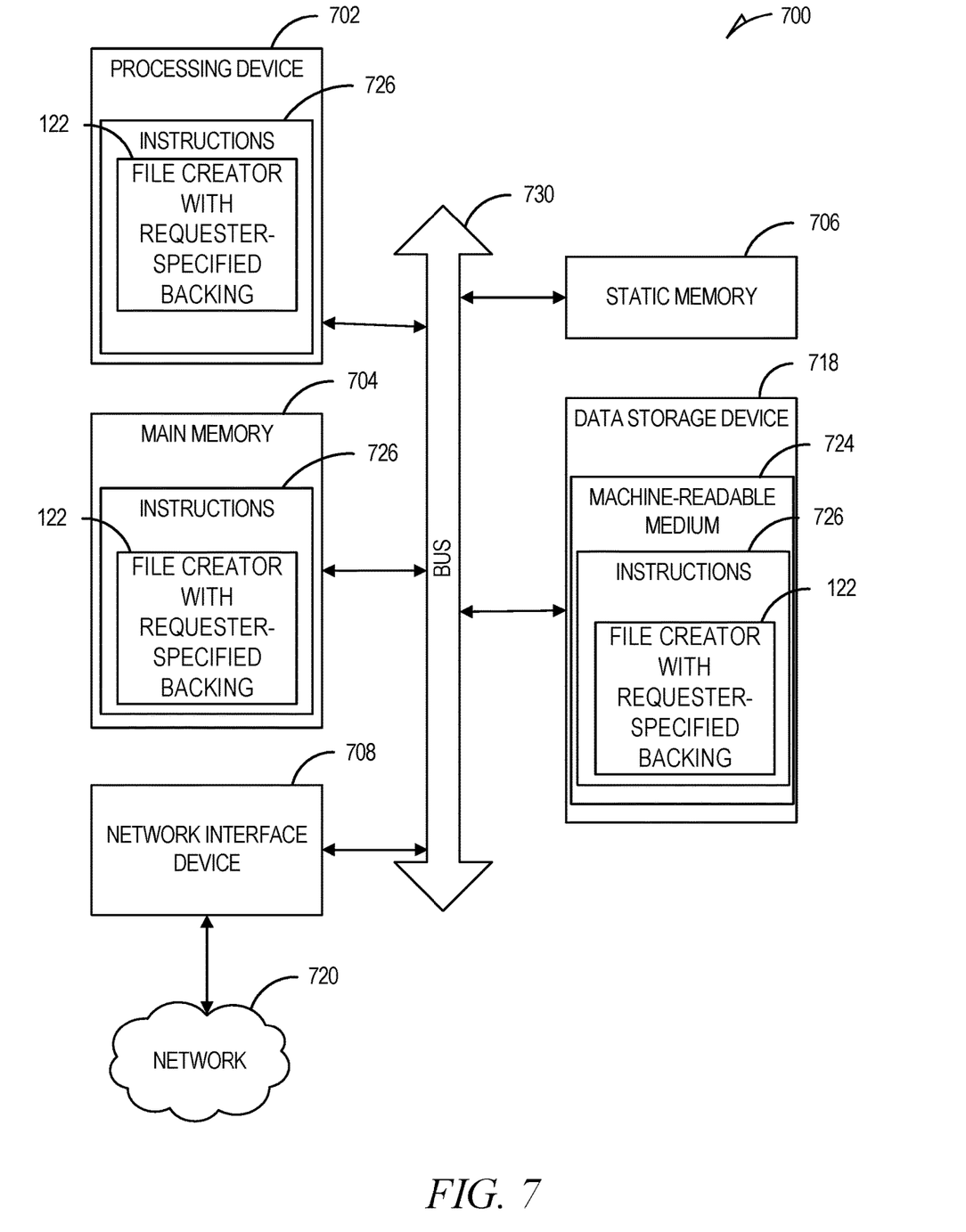
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the file creator with requester-specified backing 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to create a file backed by a requester-specified set of existing data storage objects as described herein (e.g., the file creator with requester-specified backing 122 of FIG. 1). While the machine-readable storage medium 724 is shown in an embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific embodiments thereof. It will be evident that various modifications can be made thereto without departing from embodiments of the disclosure as set forth in the following claims. The specification and drawings are, accordingly, to be regarded in an illustrative sense rather than a restrictive sense.

Examples

Example 1 is a system comprising a set of memory components, and a processing device, operatively coupled to the set of memory components, configured to perform operations comprising: receiving a request to create a new file on a file system that is backed by a specified set of existing data storage objects stored on the set of memory components; and in response to receiving the request to create the new file: generating a file data structure on the file system that represents the new file, the file data structure comprising a mapping to the specified set of existing data storage objects; and responding to the request with data that confirms creation of the new file on the file system.

In Example 2, the subject matter of Example 1 optionally includes where the operations further comprise causing the new file to be mapped into volatile memory.

In Example 3, the subject matter of Example 1 or Example 2 optionally includes where the request to create the new file comprises a request to create a memory-mapped file on the file system that is backed by the specified set of existing data storage objects.

In Example 4, the subject matter of any one of Examples 1 to 3 optionally includes where the new file is mapped into volatile memory by a memory-mapped file method that implements demand paging.

In Example 5, the subject matter of any one of Examples 1 to 4 optionally includes where the file system comprises a virtual file system.

In Example 6, the subject matter of any one of Examples 1 to 5 optionally includes where the specified set of existing data storage objects comprises an order collection of data storage objects.

In Example 7, the subject matter of any one of Examples 1 to 6 optionally includes where at least one data storage object in the specified set of existing data storage objects comprises a media data block, the media data block comprising an abstraction of a set of block device storage objects.

In Example 8, the subject matter of any one of Examples 1 to 7 optionally includes where the specified set of existing data storage objects is associated with storage of one or more portions of an existing file stored on the set of memory components.

In Example 9, the subject matter of any one of Examples 1 to 8 optionally includes where the mapping to the specified set of existing data storage objects comprising a set of universally unique identifiers corresponding to the specified set of existing data storage objects.

In Example 10, the subject matter of any one of Examples 1 to 9 optionally includes where the specified set of existing data storage objects are associated with a log structured merge tree data structure stored on the set of memory components.

In Example 11, the subject matter of any one of Examples 1 to 10 optionally includes where the log structured merge tree data structure stores a set of key-value pairs.

Example 12 is a method comprising: receiving a request to create a new file on a file system that is backed by a specified set of existing data storage objects stored on a set of memory components, and the specified set of existing data storage objects is associated with storage of one or more portions of an existing file stored on the set of memory components; and in response to receiving the request to create the new file: generating a file data structure on the file system that represents the new file, the file data structure comprising a mapping to the specified set of existing data storage objects; and responding to the request with data that confirms creation of the new file on the file system.

In Example 13, the subject matter of Example 12 optionally includes where the method further comprises causing the new file to be mapped into volatile memory.

In Example 14, the subject matter of Example 12 or Example 13 optionally includes where the request to create the new file comprises a request to create a memory-mapped file on the file system that is backed by the specified set of existing data storage objects.

In Example 15, the subject matter of any one of Examples 12 to 14 optionally includes where the new file is mapped into volatile memory by a memory-mapped file method that implements demand paging.

In Example 16, the subject matter of any one of Examples 12 to 15 optionally includes where the file system comprises a virtual file system.

In Example 17, the subject matter of any one of Examples 12 to 16 optionally includes where at least one data storage object in the specified set of existing data storage objects comprises a media data block, the media data block comprising an abstraction of a set of block device storage objects.

In Example 18, the subject matter of any one of Examples 12 to 17 optionally includes where the mapping to the specified set of existing data storage objects comprising a set of universally unique identifiers corresponding to the specified set of existing data storage objects.

In Example 19, the subject matter of any one of Examples 12 to 18 optionally includes where the specified set of existing data storage objects are associated with a log structured merge tree data structure stored on the set of memory components.

Example 20 is a non-transitory machine-readable storage medium comprising instructions that, when executed by a processing device, cause the processing device to perform operations comprising: receiving a request to create a new file on a file system that is backed by a specified set of existing data storage objects stored on a set of memory components; and in response to receiving the request to create the new file: generating a file data structure on the file system that represents the new file, the file data structure comprising a mapping to the specified set of existing data storage objects; and responding to the request with data that confirms creation of the new file on the file system.

What is claimed is:
1. A system comprising:
   a set, of memory components; and
   a processing device, operatively coupled to the set of memory components, configured to perform operations comprising:
      receiving a request to create a new file on a file system that is backed by a specified set of existing data storage objects stored on the set of memory components;
      in response to receiving the request to create the new file:
         creating the new file by generating a file data structure on the file system that represents the new file, the file data structure comprising a mapping to the specified set of existing data storage objects, and an existing data storage object in the specified set of existing data storage objects comprising at least one of:
            a block device storage object of the set of memory components; or a data storage object that is associated with a log structured merge tree data structure stored on the set of memory components; and responding to the request with data that confirms creation of the new file on the file system; and causing the new file to be mapped into volatile memory.

2. The system of claim 1, wherein the request to create the new file comprises a request to create a memory-mapped file on the file system that is backed by the specified set of existing data storage objects.

3. The system of claim 1, wherein the new file is mapped into the volatile memory by a memory-mapped file method that implements demand paging.

4. The system of claim 1, wherein the file system comprises a virtual file system.

5. The system of claim 1, wherein the specified set of existing data storage objects comprises an ordered collection of data storage objects.

6. The system of claim 1, wherein the existing data storage object comprises a media data block, the media data block comprises an abstraction of a set of block device storage objects, and the set of block device storage objects comprises the block device storage object.

7. The system of claim 1, wherein the specified set of existing data storage objects is associated with storage of one or more portions of an existing file stored on the set of memory components.

8. The system of claim 1, wherein the mapping to the specified set of existing data storage objects comprising a set of universally unique identifiers corresponding to the specified set of existing data storage objects.

9. The system of claim 1, wherein the log structured merge tree data structure stores a set of key-value pairs.

10. A method comprising:

receiving a request to create a new file on a file system that is backed by a specified set of existing data storage objects stored on a set of memory components;

in response to receiving the request to create the new file:

creating the new file by generating a file data structure on the file system that represents the new file, the file data structure comprising a mapping to the specified set of existing data storage objects, and an existing data storage object n the specified set of existing data storage objects comprising at least one of:

a block device storage object of the set of memory components; or a data storage object that is associated with a log structured merge tree d structure stored on the set of memory components; and responding to the request with data that confirms creation of the new file on e file system; and causing the new file to be mapped into volatile memory.

11. The method of claim 10, wherein the request to create the new file comprises a request to create a memory-mapped file on the file system that is backed by the specified set of existing data storage objects.

12. The method of claim 10, wherein the new file is mapped into the volatile memory by a memory-mapped file method that implements demand paging.

13. The method of claim 10, wherein the file system comprises a virtual file system.

14. The method of claim 10, wherein the existing data storage object comprises a media data block, the media data block comprises an abstraction of a set of block device storage objects, and the set of block device storage objects comprises the block device storage object.

15. The method of claim 10, wherein the mapping to the specified set of existing data storage objects comprising a set of universally unique identifiers corresponding to the specified set of existing data storage objects.

16. A non-transitory machine-readable storage medium comprising instructions that, when executed by a processing device, cause the processing device to perform operations comprising:

receiving a request to create a new file on a file system that is backed by a specified set of existing data storage objects stored on a set of memory components;

in response to receiving the request to create the new file:

creating the new file by generating a file data structure on the file system that represents the new file, the file data structure comprising a mapping to the specified set of existing data storage objects, and an existing data storage object in the specified set of existing data storage objects comprising at least one of:

a block device storage object of the set of memory components; or a data storage object that is associated with a log structured merge tree data structure stored on the set of memory components; and responding to the request with data that confirms creation of the new file on the file system; and causing the new file to be mapped into volatile memory.

17. The non-transitory machine-readable storage medium of claim 16, wherein the existing data storage object comprises a media data block, the media data block comprises an abstraction of a set of block device storage objects, and the set of block device storage objects comprises the block device storage object.

18. The non-transitory machine-readable storage medium of claim 16, wherein the log structured merge tree data structure stores a set of key-value pairs.

19. The non-transitory machine-readable storage medium of claim 16, wherein the specified set of existing data storage objects is associated with storage of one or more portions of an existing file stored on the set of memory components.

20. The method of claim 10, wherein the specified set f existing data storage objects is associated with storage of one or more portions of an existing file stored on the set of memory components.

* * * * *